United States Patent [19]
Jenkins

[11] Patent Number: 5,752,463
[45] Date of Patent: May 19, 1998

[54] BIRD ACTIVITY PLATFORM

[76] Inventor: Peter Edwin Jenkins, 7/257 Henry Parry Drive, North Gosford, New South Wales, 2250, Australia

[21] Appl. No.: 780,730

[22] Filed: Jan. 8, 1997

[30] Foreign Application Priority Data

Jan. 10, 1996 [AU] Australia .................. PN7484

[51] Int. Cl.⁶ .................. A01K 39/014; A01K 31/12
[52] U.S. Cl. .................. 119/57.8; 119/464; 119/468
[58] Field of Search .................. 119/57.8, 464, 119/468, 475, 537

[56] References Cited

U.S. PATENT DOCUMENTS 4,335,679  6/1982  Carlin .................. 119/57.8 X
5,010,848  4/1991  Rankin .................. 119/468 X
5,381,758  1/1995  Simon .................. 119/537

*Primary Examiner*—Robert P. Swiatek
*Attorney, Agent, or Firm*—Michael J. Striker

[57] ABSTRACT

A bird activity platform comprising a floor, a back board attached along an edge of the floor, the back board being constructed to permit its attachment to a vertical surface, a runway extending from the back board to the opposite edge of the floor and being raised above the level of the floor, the runway being constructed and arranged to act as a landing platform for a bird, a pole extending upwardly from the surface of the floor and having at its upper end a pair at least of horizontally extending perches subtending an angle between them, a seed feeder arranged at the end of the runway remote from the back board and shield means arranged around the end of the runway and the seed feeder to confine spilt seed to the area of the floor.

6 Claims, 4 Drawing Sheets

BIRD ACTIVITY PLATFORM

The present invention relates to a bird activity platform for pet birds being a device for use indoors to provide a platform which will allow a pet bird to fly to and from its normal cage, land on, move around on, feed on and use as a base for flying exercises prior to its return to its normal cage.

A bird activity platform according to the invention consists in a floor, a back board attached along an edge of the floor, the back board being constructed to permit its attachment to a vertical surface, a runway extending from the back board to the opposite edge of the floor and being raised above the level of the floor, the runway being constructed and arranged to act as a landing platform for a bird, a pole extending upwardly from the surface of the floor and having at its upper end a pair at least of horizontally extending perches subtending an angle between them, a seed feeder arranged at the end of the runway remote from the back board and shield means arranged around the end of the runway and the seed feeder to confine spilt seed to the area of the floor. It is preferred that means are provided on the perch pole to permit a ball, bell or another accessory to be hung thereon.

In order that the nature of the invention may be better understood, a preferred form thereof is hereinafter described by way of example with reference to the accompanying drawings in which.

Figure 1:
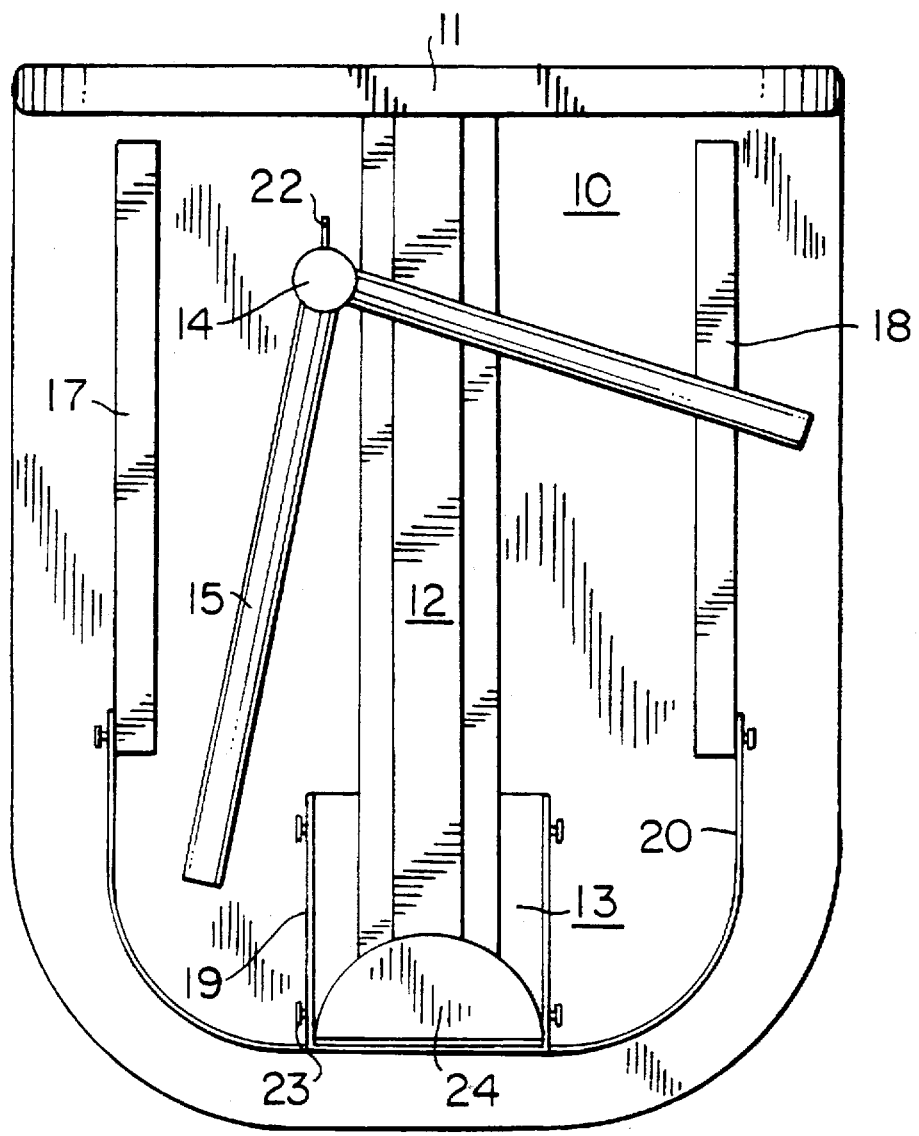
FIG. 1 is a top plan view of a bird activity platform according to the invention.
Figure 2:
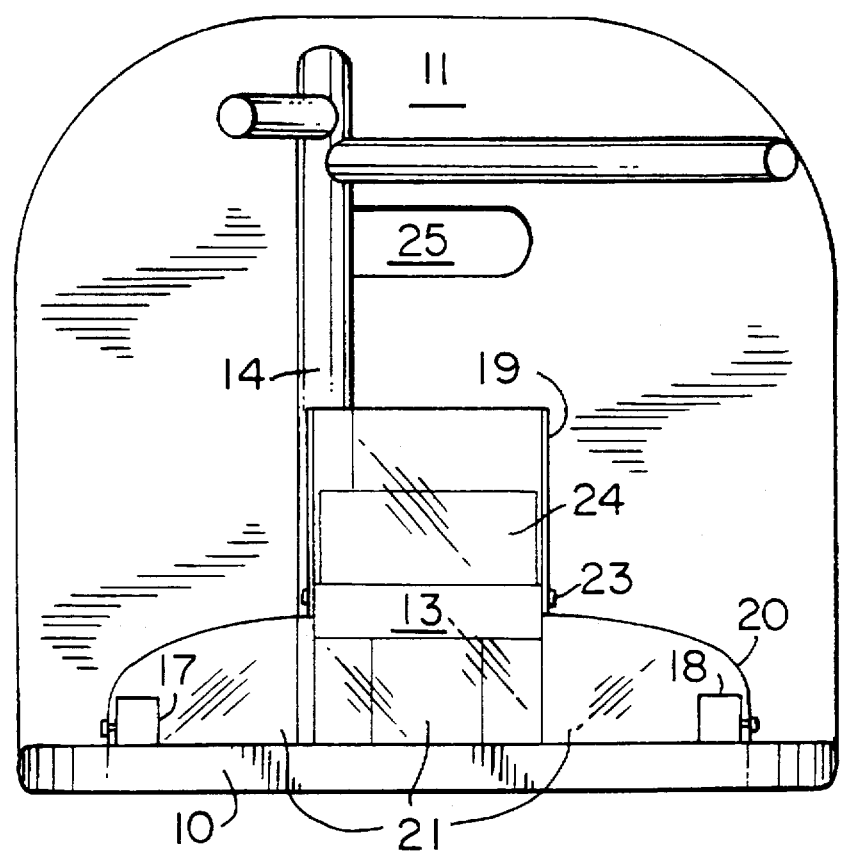
FIG. 2 is a front view thereof.
Figure 3:
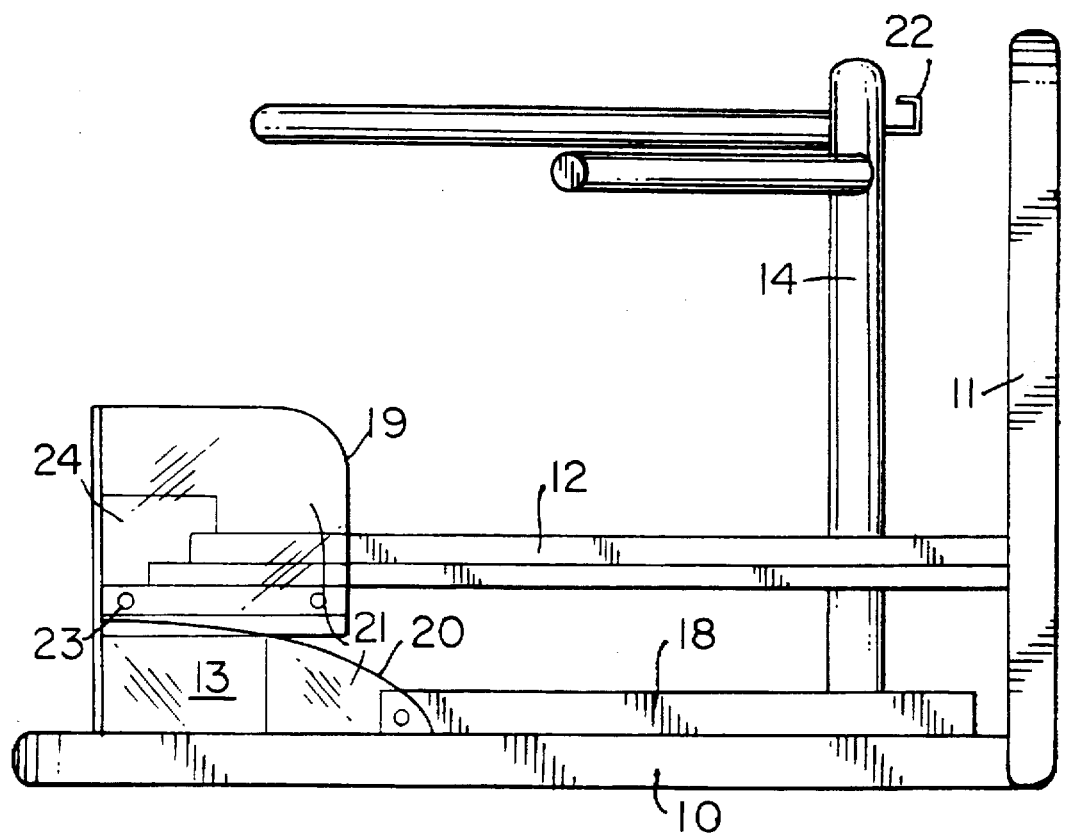
FIG. 3 is a side view from the right.
Figure 4:
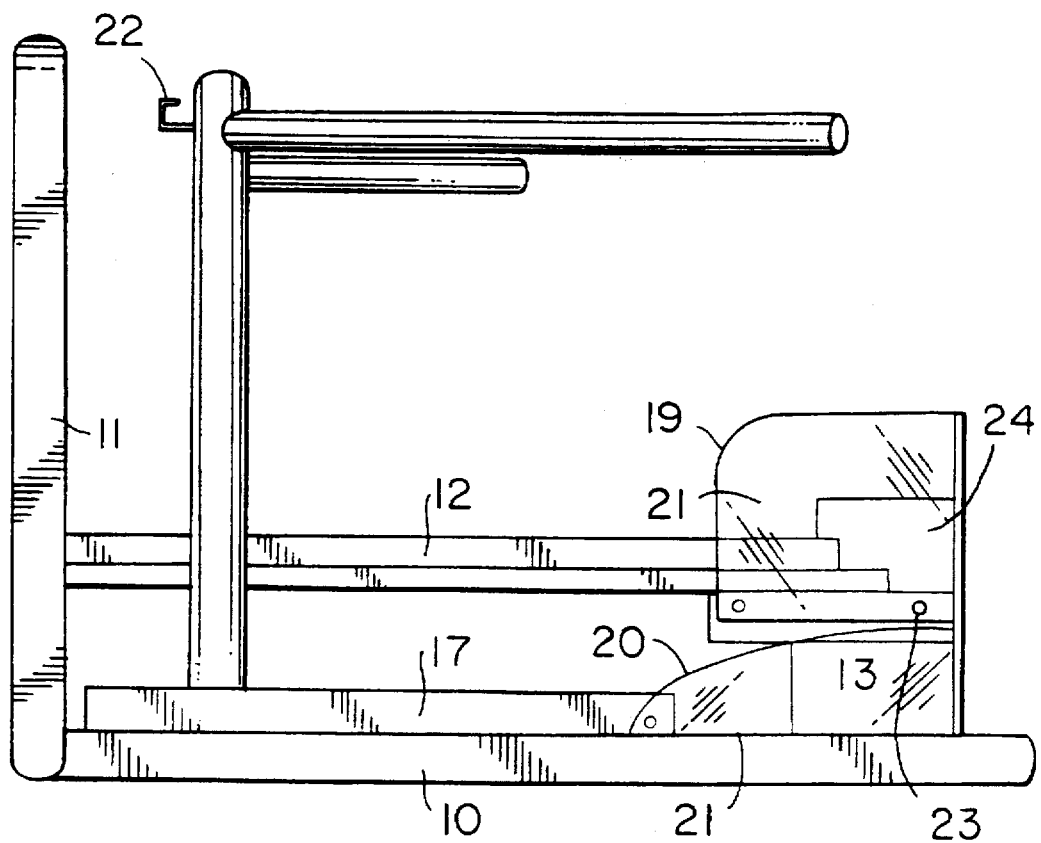
FIG. 4 is a side view from the left.

Particulars of the component parts of the preferred form of the invention are described in detail below.

(i) THE FLOOR 10

(a) Shape, Size and Location

The shape is rectangular, with front rounded corners of approximately 90 mm radius.

The size of the floor is 365 mm long by 290 mm wide, and 17 mm thick.

The floor is the base of the entire structure, and it joins the back board at right angles.

(b) Material Make-Up

The floor will be made of wood—pine in most models. (A plastic moulded floor may be an option in some models.)

The surface of the wooden floor, its edges and its underneath side are to be treated with a thin coat of environmentally friendly oil, or nontoxic sealer.

(c) Purpose

The floor has primarily 5 purposes, namely:

(i) as the base for the runway/landing and its supports, the perch pole, the plastic and the wooden shields and the back board;

(ii) as a collector of the bird's droppings. Birds positioned anywhere on the structure, including the perches, will have their droppings, in most cases, caught by the floor. Some droppings may actually land on the runway/landing;

(iii) as a collector of seed husks. When feeding, the bird will cause a residue of husks. Most will remain on the section of runway/landing between the plastic shield and the seed feeder. These will be removed during cleaning time by the owner.

Other husks will be blown out onto the floor of the structure. This will happen because of the draught caused by the bird's wings when the bird is landing or taking off;

(iv) as a platform for the egg/biscuit tray, fruit tray, water tray; which are optional and, indirectly as a support for the seed feeder. It is suggested that only very small quantities of seed, water, fruit, egg and biscuit, etc. are to be made available to the bird.

The presence of the food and water is twofold:

(1) to maintain the bird's attraction to the structure; and (2) to allow continuity of feeding access for the bird while it remains out of the cage.

(v) as a general exercise area. The bird will use the floor as a landing or taking off place and also as an area in which it will roam and play, especially in the "cave" region formed by the runway/landing platform and the runway/landing supports. The "cave" being formed at the front of the structure by the added existence of the plastic shield.

(ii) THE BACK BOARD 11

(a) Shape, Size and Location

The shape of the back board is similar to the floor in that it is rectangular and its top possesses the similar rounded corners of 90 mm radius. It joins the floor at right angles using glue and screws.

The back board dimensions are 280 mm high, 290 mm wide and 17 mm thick.

Approximately 80 mm from the top and positioned centre in the back board, a rectangular hole will be located for the sole purpose of hanging the structure on a wall or other selected location in the room. The hole will be 60 mm across by 20 mm.

(b) Material Make-Up

The back board will be made with the same material as is the floor. It will also be given the oil treatment.

(c) Purpose

The purpose of the back board is:

(i) to support the floor;

(ii) to allow the structure to be hung on a wall (or other selected location).

(iii) to protect the wall from possible bird pecking;

(iv) to allow the use of such items as a mirror, a bird toy, etc. These items may be fixed (as options) by nailing, screwing and/or tying.

(iii) THE PERCH POLE 14

(a) Shape, Size and Location

The perch pole is cylindrical in shape with a slightly rounded top. It has a diameter of 20 mm.

It stands vertically, 250 mm tall, and is located toward the back of the structure and is sunk 10 mm into the floor, leaving 250 mm of the pole above the floor level. The pole is 55 mm from the back board, and is 100 mm from the left-end edge of the floor.

(b) Material Make-Up

The perch pole is made of wood.

The perch pole is also given the oil treatment as described in the floor component.

(c) Purpose

The perch pole supports the suspended perches 15 and 16 and the hook 22.

(iv) THE HOOK 22

(a) Shape, Size and Location

The hook protrudes approximately 10 mm from the surface of the perch pole, with a diameter of 3 mm, and with a circular shaped hook-end of radius 8 mm.

The hook is located approximately 20 mm from the top of the perch pole with the hook shaft at right-angles to the pole. The "hook-end" section runs vertically. The hook is on the rear side of the perch pole (i.e. facing the back board).

(b) Material Make-Up

It is made of metal.

(c) Purpose

To allow one or more accessories e.g., bell seed stick, etc to be hung.

The hook is positioned in the location described herein so that no injury is possible to the bird as the bird moves about.

(v) THE PERCHES 15 and 16

(a) Shape, size and Location

There are two cylindrical perches, both having diameters of approximately 12 mm.

Perch No. 1, approximately 205 mm long (with a further 10 mm inserted into the perch pole), is located approximately 8 mm from the top of the perch pole. It is horizontal and protrudes out towards the front of the structure and pointing toward the left-end edge, making an angle of 12° with the structure's centre line.

Perch No. 2, approximately 160 mm long (with a further 10 mm inserted into the perch pole), is located slightly below Perch No. 1. The top horizontal edge of Perch No. 2 is approximately 2 mm below the underneath horizontal edge of Perch No. 1. Perch No. 2 is horizontal and protrudes out towards the front of the structure and pointing toward the right-end edge, making an angle of approximately 70° with the structure's centre line.

(b) Material Make-Up

Both perch poles are made of wood dowel.

It is suggested that the cylindrical perch bird sand paper, which is commercially available, be fixed onto at least one of the perches. Besides the normal reasons for such sand paper, it also provides a variation in the diameter size of perch which is beneficial to the bird.

(c) Purpose

The purpose of the two perches is:

(i) to provide a place for the bird to land and take-off;
(ii) to provide a location for the bird to move about on and/or to rest; and
(iii) to provide access to the top part of the back board, should bird toys be fixed in that region of the structure.

(vi) THE RUNWAY/LANDING PLATFORM 12

(a) Shape, Size and Location

This is a raised platform 55 mm above the floor, running from the front to the back of the structure; beginning 33 mm from the front of the structure, and meeting the back board flush.

The runway/landing platform is positioned centre within the structure.

The platform has a cross-section shape which would be best described as an upside-down capital letter T.

The horizontal section of the upside-down T measures 50 mm wide by 8 mm.

The vertical section of the upside-down T measures 28 mm wide by 10 mm.

The platform is supported at the front end by one set of runway/landing supports which are 55 mm high. The platform is also fastened to the backboard with glue and a screw.

The distance the platform is from the perches and the floor is comfortable for the bird's movements while on the structure.

(b) Material Make-Up

The platform is to be made and shaped from the one piece of timber (pine in most models).

The oil treatment, as described in the floor, will be applied.

(c) Purpose (i) The dimensions of the runway/landing platform are such that, wherever the bird sits on the platform, the bird's droppings will in most instances land on the floor of the structure. Some will land on the platform depending on the angle at which the bird sits.

The dimensions of the platform also provide the bird with a variety of "perch" size which is essential for toe exercise for caged birds.

(ii) The shape of the platform allows the natural slope of the bird's sitting posture to be uninterrupted.

(iii) The platform houses the seed feeder at the front end of the structure and allows the bird to have access to optional items attached to the back board (e.g., mirror).

(iv) The platform acts as a "shelter" or "roof" which links the "cave", thus giving the bird more variation in its activities.

(vii) THE RUNWAY/LANDING SUPPORT 13

(a) Shape, Size and Location

There is one runway/landing support which is located at the front end of the structure.

The support at the front end of the structure consists of two vertical uprights, each with a height 38 mm and 17 mm wide. The vertical uprights have a space of 46 mm between them.

The two vertical uprights run in the same direction as the runway/landing platform for a distance of 60 mm. Spanning these two uprights is a horizontal cross member which sits on the two uprights and flush with them at the front and sides, adding another 17 mm to the height of the support. The total height of the front support being 55 mm.

The horizontal cross member 13 runs for a distance of 90 mm toward the back of the structure, underneath and supporting the runway/landing platform.

The location of the supports create a "cave" effect at the front end of the structure.

(b) Material Make-Up

The supports will be made of timber (pine in most models), and treated with the vegetable oil as in the floor.

(c) Purpose (i) To support the runway/landing platform 55 mm above the floor level.

(ii) The horizontal cross member in the front support helps to collect the seed husks which result from the bird feeding.

(iii) To make available added regions (i.e., the "cave" and "roof") which will interest the bird.

(viii) THE SEED FEEDER 24

(a) Shape, Size and Location

The seed feeder will have a diameter of approximately 80 mm and a height of 30 mm. It will be "sunk" into the runway/landing to a depth of approximately 19 mm.

This will add stability to, and easy removal of, the seed feeder.

The seed feeder will be located approximately 2 mm from the front edge of the runway/landing.

(b) Material Make-Up

The seed feeder will be made of plastic.

(c) Purpose

To make food available to the bird while it is on the structure.

(ix) THE SHIELDS 17, 18, 19, 20

(a) Shape, Size and Location

There are two sets of shields.

One shield, 19 which will be referred to as the front shield, has two sections to it and joined together to make one shield. 19 is the upper section, 20 is the lower section.

This front shield begins 30 mm in from the right-end edge of the structure, approximately 130 mm from the front of the structure, with the base of the shield at floor level. This base follows a path 30 mm in from the floor's edge and parallel to it, right around to the same distance from the front edge on the left-end edge of the structure.

This section is referred to as the lower section.

The lower section begins, with a thickness of 3 mm which is maintained throughout, at floor level (130 mm from the front on each side of the structure as described). With a gentle curve, it rises to a height of approximately 43 mm. This height of 43 mm is reached at a distance of 97 mm in from both the right-end edge and the left-end edge of the structure.

At these two points the upper section of this front shield commences. The shield rises vertically to a height of 125 mm above floor level. As well as rising 125 mm in the front at these two points, two sections (3 mm thick) branch off at right angles to the shield described so far.

These two sections extend towards the back of the structure for a distance of 95 mm, with rounded corners of approximately 20 mm radius.

The other set of shields 17, and 18 which could be referred to as side shields (one on each side of the structure), are 220 mm long and begin 10 mm from the back board at floor level and 30 mm in from the floor's side edge. They both run parallel to the runway/landing platform and both overlap the front shield by approximately 16 mm.

The side shields are 17 mm wide and 17 mm high.

The front shield 20 is pinned with screws to the runway/landing support at four evenly spaced points. Two on each side of the front runway/landing support.

The front shield is also pinned to both of the side shields; one screw on each of the overlaps of the front shield and the side shields.

(b) Material Make-Up

The front shield, including both the upper and the lower sections, will be made of clear polycarbonate.

The side shields will be timber.

(c) Purpose

To prevent the seed husks from moving off the structure before cleaning.

(x) THE WALL BRACKET (a) Shape, Size and Location

The wall bracket is a component which is located on the wall at a height selected by the pet owner. It is advised that it should be at a height which presents no problem especially in regards to safety both to people and to bird.

The shape is a simple J where the longer side is attached to the wall. The height of the bracket is 50 mm and with a width of 50 mm. The aperture 25 in the back board fits over the bracket.

The shorter side (or "lip") is approximately 10 mm high.

The distance between both the longer and the shorter front section is approximately 18 mm.

The bracket will be fixed to the wall with two screws.

(b) Material Make-Up

Metal approximately 2 mm thick.

(c) Purpose

To safely secure the inventive device to the wall.

Certain points need to be mentioned here:

(i) All components except the plastic shield and the seed feeder are glued to the respective positions with appropriate and environmentally friendly glue.

(ii) Stickers are used on the plastic shield, particularly on the upper section, in order to reduce the risk of a bird flying into the clear plastic or perspex.

(iii) Clear plastic or polycarbonate is selected because it allows the bird to view out toward the room while feeding, thus reducing the anxiety the bird may have about the instinct of danger.

(iv) The ball and bell is a commercially available toy which seems to be an essential item.

In conclusion, certain distinct advantages are obvious when putting this inventive device to use:

(a) Pet birds can be viewed in a less restrictive way. No bars are between the bird and the pet owner.

(b) The "taming" process for the more shy birds may be carried out more easily and more successfully, as greater "closeness" to the bird, without obstruction, is possible.

(c) The bird's droppings are restricted to the structure and, therefore, the concerns in terms of damage to furniture and carpet are eliminated.

(d) Optional items such as a mirror, toys, cuttlefish, ladder, etc. may be added to the structure at the pet owner's discretion.

(e) Birds will tend not to want to fly to open doors or windows as they will appear to be attracted to their structure's surroundings.

(f) Cleaning, which should take place after each time the structure is used, is made easy.

It is suggested by some that feeding pet birds outside of their cage is not good. The feeding process, however, is essential with this structure as it is an extension of their cage life. It is strongly advised that this feeding take place only in the cage or on the structure, and not elsewhere outside the cage.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A bird activity platform comprising a floor, a back board attached along an edge of the floor, the back board being constructed to permit its attachment to a vertical surface, a runway extending from the back board to the opposite edge of the floor and being raised above the level of the floor, the runway being constructed and arranged to act as a landing platform for a bird, a pole extending upwardly from the surface of the floor and having at its upper end a pair at least of horizontally extending perches subtending an angle between them, a seed feeder arranged at the end of the runway remote from the back board and shield means arranged around the end of the runway and the seed feeder to confine spilt seed to the area of the floor.

2. A bird activity platform as claimed in claim 1 wherein means are provided on the perch pole to permit a ball, bell or other accessory to be hung.

3. A bird activity platform as claimed in claim 1 wherein the runway has throughout its length a section corresponding to an inverted T, the central portion corresponding to the upright of the T having a surface raised above that of the portion corresponding to the horizontal part of the T to allow for the natural slope of a bird's sitting posture.

4. A bird activity platform as claimed in claim 1 wherein the shield means comprises two sets of shields namely a front shield and side shields, the front shield being of transparent material.

5. A bird activity platform as claimed in claim 1 wherein the end of the runway remote from the backboard is supported by means adapted to form a "cave" beneath that end of the runway.

6. A bird activity platform as claimed in claim 1 wherein the said horizontally extending perches subtend at an angle between them of approximately 82°.

* * * * *